US008855931B2

(12) United States Patent
Kirmse et al.

(10) Patent No.: US 8,855,931 B2
(45) Date of Patent: Oct. 7, 2014

(54) LOCATION HISTORY FILTERING (71) Applicant: Google Inc., Mountain View, CA (US)

(72) Inventors: Andrew Kirmse, Redwood City, CA (US); Gokay Baris Gultekin, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 50 days.

(21) Appl. No.: 13/737,720

(22) Filed: Jan. 9, 2013

(65) Prior Publication Data

US 2013/0345965 A1  Dec. 26, 2013

Related U.S. Application Data (60) Provisional application No. 61/664,144, filed on Jun. 25, 2012.

(51) Int. Cl.
*G07C 5/08* (2006.01)
*G06F 17/30* (2006.01)
*G01C 21/00* (2006.01)
*G01S 5/00* (2006.01)
*H04W 4/02* (2009.01)
*H04W 4/04* (2009.01)

(52) U.S. Cl.
CPC ............ *G01C 21/00* (2013.01); *H04W 4/043* (2013.01); *G01S 5/0027* (2013.01); *H04W 4/027* (2013.01)
USPC ............................. 701/537; 701/516; 701/522

(58) Field of Classification Search
USPC ......... 701/408, 483, 484, 516, 519, 522, 532, 701/537, 538, 541
See application file for complete search history.

(56) References Cited

U.S. PATENT DOCUMENTS

| 7,245,214 | B2 * | 7/2007 | Smith | 701/469 |
|---|---|---|---|---|
| 7,737,868 | B2 * | 6/2010 | Sheha et al. | 700/200 |
| 7,751,971 | B2 | 7/2010 | Chang et al. | |
| 8,427,979 | B1 * | 4/2013 | Wang | 370/254 |
| 2002/0069312 | A1 * | 6/2002 | Jones | 711/100 |
| 2008/0045234 | A1 | 2/2008 | Reed | |
| 2008/0096517 | A1 * | 4/2008 | Appleyard et al. | 455/403 |
| 2008/0189374 | A1 | 8/2008 | Odell et al. | |
| 2008/0248815 | A1 | 10/2008 | Busch | |
| 2009/0043896 | A1 * | 2/2009 | Law | 709/228 |
| 2009/0325570 | A1 * | 12/2009 | Rensin et al. | 455/422.1 |

(Continued)

OTHER PUBLICATIONS

International Search Report and Written Opinion of International Application No. PCT/US2013/047655, mailed Sep. 19, 2013, 8 pp.

*Primary Examiner* — Helal A Algahaim
*Assistant Examiner* — Dale W Hilgendorf
(74) *Attorney, Agent, or Firm* — Shumaker & Sieffert, P.A.

(57) ABSTRACT

In general, techniques, devices, and systems for filtering location information received from multiple computing devices are described. In one example, a method includes receiving a first plurality of location indicators from a first mobile computing device and a second plurality of location indicators from a second mobile computing device, wherein the first and second computing devices are both associated with a single user and the first and second pluralities of location indicators are representative of geographical locations at which each of the respective first and second mobile computing devices has been located. The method may also include determining a subset of the location indicators for a period of time, all location indicators included in the subset being associated with the one of the first or second mobile computing devices that moved with the user during the period of time, and outputting information related to the subset of the location indicators.

20 Claims, 5 Drawing Sheets (56) References Cited

U.S. PATENT DOCUMENTS

| | | | |
|---|---|---|---|
| 2010/0004997 A1* | 1/2010 | Mehta et al. | 705/14.66 |
| 2010/0076968 A1* | 3/2010 | Boyns et al. | 707/732 |
| 2010/0255856 A1 | 10/2010 | Kansal et al. | |
| 2011/0051665 A1 | 3/2011 | Huang | |
| 2011/0071881 A1 | 3/2011 | Zheng et al. | |
| 2011/0106911 A1* | 5/2011 | Sung et al. | 709/217 |
| 2011/0177831 A1 | 7/2011 | Huang | |
| 2011/0208425 A1 | 8/2011 | Zheng et al. | |
| 2011/0221635 A1* | 9/2011 | Wang | 342/463 |
| 2011/0314482 A1* | 12/2011 | Cupala et al. | 719/328 |
| 2012/0295566 A1* | 11/2012 | Collins et al. | 455/404.1 |

* cited by examiner

LOCATION HISTORY FILTERING

This application claims the benefit of U.S. Provisional Application No. 61/664,144, filed Jun. 25, 2012, the entire content of each of which is incorporated herein by reference.

BACKGROUND

A user may interact, via a user interface, with applications executing on a computing device (e.g., mobile phone, tablet computer, smartphone). For instance, a user may interact with a user interface of a computing device to install, view, or delete an application stored at a memory of the computing device. In some instances, a user may use a mobile device (e.g., mobile phone, tablet computer, smartphone) to communicate with other devices or systems. For instance, a user may interact with a user interface of the mobile device to transmit information (e.g., data generated by the mobile device or requests from the user for specific information) from the mobile device to a remote computing device. The mobile device may also receive information from a remote computing device (e.g., a network server) over a network.

In some examples, the mobile device may generate information regarding the location of the mobile device. This location information may be obtained by the mobile computing device using global positioning system (GPS) satellites or from triangulation using cellular network towers or other network access points, for example. The location information may be used to locate the mobile device in an interactive map or otherwise identify the location of the mobile device for one or more services of the mobile device used by the user.

SUMMARY

In one example, a method includes receiving, at a computing device, a first plurality of location indicators from a first mobile computing device and a second plurality of location indicators from a second mobile computing device, wherein the first and second computing devices are both associated with a single user and the first and second pluralities of location indicators are representative of geographical locations at which each of the respective first and second mobile computing devices has been located; determining, by the computing device, a subset of the first and second pluralities of location indicators for a period of time, all location indicators included in the subset being associated with the one of the first mobile computing device or the second mobile computing device that moved with the user during the period of time; and outputting, by the computing device, information related to the subset of the location indicators for the period of time.

In another example, a computing device includes one or more processors and a location history module operable by the one or more processors to: receive a first plurality of location indicators from a first mobile computing device and a second plurality of location indicators from a second mobile computing device, wherein the first and second mobile computing devices are both associated with a user and the first and second pluralities of location indicators are representative of geographical locations at which each of the respective mobile computing devices has been located; determine a first subset of the first and second pluralities of location indicators for a first period of time, all location indicators included in the first subset being associated with the one of the first mobile computing device or the second mobile computing device that moved with the user during the first period of time; determine a second subset of the first and second pluralities of location indicators for a second period of time different than the first period of time, all location indicators included in the second subset being associated with the one of the first mobile computing device or the second mobile computing device that moved with the user during the second period of time; and output information related to the first and second subsets of the location indicators for the respective first and second periods of time.

In another example, a computer-readable storage medium is encoded with instructions that cause one or more processors of a mobile computing device to receive a first plurality of location indicators from a first mobile computing device and a second plurality of location indicators from a second mobile computing device, wherein the first and second mobile computing devices are associated with a user and the first and second pluralities of location indicators are representative of geographical locations at which each of the respective mobile computing devices has been located; determine a first subset of the first and second pluralities of location indicators for a period of time, all location indicators included in the subset being associated with the one of the first mobile computing device or the second mobile computing device that moved with the user during the period of time; discard a second subset of the first and second pluralities of location indicators different than the first subset of the location indicators, wherein the second subset of location indicators is associated with the one of the first mobile computing device or second mobile computing device that did not move with the user during the period of time; and output information related to the first subset of the location indicators for the period of time.

The details of one or more examples are set forth in the accompanying drawings and the description below. Other features, objects, and advantages will be apparent from the description and drawings, and from the claims.

DETAILED DESCRIPTION

In general, techniques and systems for filtering location information received from multiple computing devices are described. Computing devices may take many different forms such as mobile computing devices (e.g., cellular phones, smartphones, smart watches, tablet computers, notebook computers, and navigation devices) or more stationary workstations. In some cases, a single user may own or otherwise use multiple different computing devices. For example, a single user may use two different mobile devices (e.g., one or more smartphones, smart watches, tablet computers, laptop computers, and/or other mobile computing devices). Each of these mobile computing devices may be associated with the user.

Each of the respective mobile computing devices associated with a user may, at various times, generate and/or transmit location indicators that each represents a current location of that respective mobile computing device. These location indicators may be transmitted, over a network, to one or more server devices and used by one or more applications or processes resident thereon to generate and/or provide, to the user, information relevant to these locations. In one example, the information provided to the user and based on the location indicators may include information regarding historical locations or destinations at which the user has visited. In another example, the information provided to the user may be based on the location indicators and include information or suggestions (e.g., upcoming events or coupons) related to locations that the user may desire to visit in the future. In this manner, a networked server may generate and transmit information for consumption by the user based on where the user has traveled and/or been physically located in the past. In other examples, a server may generate and transmit, to one or more of the mobile devices, one or more notifications based on a current or past location of one or more of the mobile devices. Such notifications could, for example, include and/or provide coupons or event information related to the locations.

Location indicators received from one or more mobile computing devices located remotely from the user during a given period of time may not accurately indicate the user's location during that period of time, however. In other words, one or more servers may inappropriately define multiple locations for the user at the same given time period if location indicators from one or more such mobile computing devices of the user is considered. Thus, because in some instances the user may not have carried or be currently carrying all of his/her mobile computing devices at the same time (e.g., the user may carry a smartphone while a tablet computer remains at home), a server may not be capable of accurately determining the actual location of the user during a given period of time based on the multiple location indicators. Said differently, the one or more servers may not be able to differentiate location indicators received from a mobile computing device being carried by the user from location indicators received from a mobile computing device not being carried by the user during the period of time. Thus, location indicators received from multiple mobile computing devices associated with a user may, without further analysis, be of minimal utility in accurately determining a location of a user at a given time.

Techniques of this disclosure may, in various instances, enable a computing device (e.g., a mobile computing device or a networked server) to determine, or filter, location indicators representative of the user's location during a given period of time from location indicators not representative of the user's location during that given period time. In other words, a computing device may be configured to differentiate between location identifiers that were received from a mobile computing device carried by the user from those from a mobile computing device not carried by the user during the given period of time. For example, one or more servers can be configured to analyze the received location indicators to determine which location indicators, or set of location indicators, indicate movement, over time, of a mobile computing device. Those location indicators associated with greater movement or distance between the location indicators may be determined to be representative of the user's location during the given period of time. Since computing devices carried by the user will likely travel further than computing devices not carried by the user (e.g., devices left in a house or at an office), the location identifiers indicating movement of a greater distance over the given period of time may be selected for further use and/or used to identify which of the computing devices were carried by the user during that period of time.

In one example, a server may receive location indicators from multiple computing devices via a network. The server may separate the location indicators into individual location streams based on a device identifier associated with each location indicator. In other words, each location stream may only include location indicators from a single computing device. After filtering the location indicators to remove at least some movement artifacts, the server may distribute location indicators from each location stream into predetermined periods of time. For each time period and location stream, the server may then calculate the total distance between consecutive location indicators. The server may then, in some implementations, select or determine the location indicators of the location stream with the greatest total distance to represent the location of the user for that time period. Unselected location indicators may then be discarded by the server. This process may be repeated for any number or duration of periods of time.

In this manner, location indicators representative of the actual user location for the given time period may be differentiated from other location indicators. In some examples, the location indicators from computing devices remote from the user may be considered "noisy" indicators. Analysis of the location indicators described herein may thus differentiate active computing devices (e.g., computing devices carried and/or used by the user) from idle computing devices (e.g., computing devices not carried and/or used by the user) during any number of periods of time. In some examples, the selected location indicators may be used to identify which computing device or devices were carried by the user during a given period of time. Differentiation between active and idle computing devices may thus, in some implementations, be accomplished using location information and without determining processing usage of each device, which applications are being used by each device, which devices are receiving input from the user, or other metrics typically considered indicative of computing device use.

The location history filtering described herein may be generally performed by a location history module and/or other processors of a networked server. However, in some examples, one or more aspects of the process may be distributed to another computing device such as a remote computing device or even by a mobile computing device itself (e.g., the mobile computing device that transmitted at least some of the location identifiers being processed by the server). Although computing devices associated with a single user are generally described as standalone devices such as a smartphone or tablet computer, the computing devices may instead by integrated into another device or system. For example, computing devices associated with a user may include a navigation system installed in an automobile. In this manner, the computing device may be integrated or a part of another system in some examples.

Figure 1:
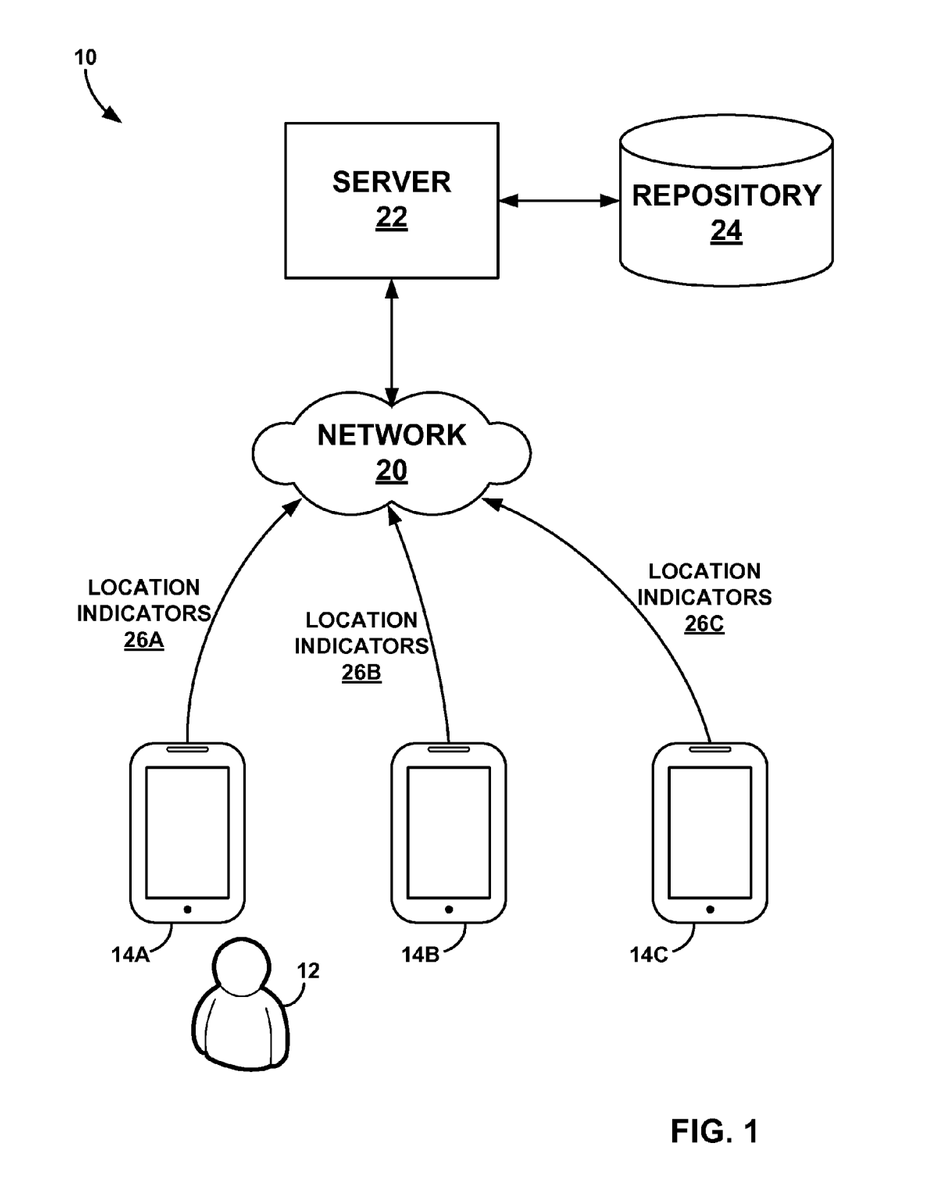
FIG. 1 is a conceptual diagram illustrating an example system that includes multiple computing devices each configured to transmit location indicators and a server configured to determine which computing device moved with the user based on the indicators, in accordance with one or more aspects of the present disclosure.

FIG. 1 is a conceptual diagram illustrating an example system 10 that includes multiple computing devices 14A, 14B, and 14C (collectively "computing devices 14") each configured to transmit location indicators 26A, 26B, and 26C (collectively "location indicators 26") and server 22 configured to determine which computing device moved with user 12 based on the indicators. As shown in FIG. 1, system 10 includes computing devices 14, network 20, network server 22, and repository 24. Each of computing devices 14 may be carried (separately or together) or otherwise associated with user 12.

Each of computing devices 14, in some examples, is or may be a part of a portable or mobile computing device (e.g., a mobile phone, a netbook, a notebook, or a tablet device). In other examples, computing devices 14 may include or be a part of a digital camera, a music player, a navigation device, or any other computing device that a user may carry or move between different locations. Although each of computing devices 14 may generally be portable or mobile, one or more of computing devices 14 may be stationary or minimally portable. Computing devices 14 may also connect to network 20 (e.g., a wired or wireless network). Although network 20 may be a single network, network 20 may be representative of two or more networks that allow computing devices 14 to communicate with network server 22.

Computing devices 14 may each include a user interface (not shown) that includes one or more input devices and/or output devices so that the user can communicate with computing devices 14. In one example, the user interface may be a touch screen interface. In some examples, the user interface may include a display and one or more buttons, pads, joysticks, mice, tactile device, or any other device capable of turning user actions into electrical signals that control computing devices 14. In any example, the user may interact with the user interface to provide input prior to or during the processes described herein. User 12 may interact with one or more of computing devices 14 at any given time. In some examples, user 12 may carry one of computing devices 14 during one portion of the day and a different one of computing devices 14 during a different portion of the day.

Each of computing devices 14 may also include a network interface (shown in FIG. 2) and other hardware that facilitates communication with network 20. As described herein, computing devices 14 may be configured to upload or transmit respective location indicators 26 as a representation of respective geographical locations at which each computing device 14 (and possibly user 12) have visited over time. For example, although user 12 may carry computing device 14A during one day, computing devices 14B and 14C may remain stationary at the home of user 12. Each of location indicators 26 may be representative of latitude and longitude coordinates, destinations such as restaurants, stores, libraries, workplaces, parks, recreation facilities, schools, or any other places that user 12 may have visited.

When each of computing devices 14 are powered on, the computing devices may generate and/or transmit respective location indicators 26 to server 22 via network 20. These location indicators 26 may be generated and/or transmitted regardless of whether the respective computing device 14 is moving. Location indicators 26 may be generated and/or transmitted by a computing device in an active state (e.g., user 12 is interacting with the device) or an idle state (e.g., user 12 is not interacting with the device but the device is powered on). Each of computing devices 14 may continually generate and/or transmit respective location indicators 26 at predetermined times and/or as locations changes. Server 22 may thus receive hundreds, thousands, or even more location indicators 26 over time. At least some of location indicators 26 may be maintained or stored by network server 22 and repository 24. In some examples, location indicators 26 may be associated with user 12 when user 12 is logged into an application of computing device 14 or listed as the user of computing device 14. Network server 22 may maintain the association between user 12 and computing devices 14.

Computing devices 14 may generate location indicators 26 using one or more techniques. For example, computing device 14 may use a global positioning system (GPS) device to obtain latitude and longitude coordinates of the respective computing device 14. In another example, computing devices 14 may derive its position using one or more network access points (e.g., wireless towers or local area network access devices) to which computing device 14 are connected. In some examples, computing devices 14 may triangulate their approximate position from multiple cellular towers. In another example, each of computing devices 14 may determine its respective position by recognizing other computing devices using short-range communication or other communication protocols. In any case, each of location indicators 26 may be generated for a respective location at which user the respective computing device 14 visited for at least one instance in time. Computing devices 14 may generate each of location indicators 26 using any one or combination of these or other position detecting techniques.

Each of location indicators 26 may include some data representative of the respective location 16 at which the location identifier was generated. For example, location indicators 26 may include one or more GPS coordinates, distance and direction from a known location, and/or a known landmark for which network server 22 may derive the position of the landmark. Network server 22 may store each of the received location indicators 26 in repository 24. Network server 22 may format each of location indicators 26 into a predetermined format prior to or after storing each location identifier in repository 24. Network server 22 may then analyze received location indicators 26 to identify which of the location indicators 26 are representative of geographical locations at which user 12 was located. Network server 22 may also identify which one or more of computing devices 14 was associated with location indicators 26 representative of the location of user 12.

Each of location indicators 26 may also be associated with or include a device identifier. The device identifier may be a code or data that identifies the specific one of computing devices 14 that transmitted the respective location indicator 26. In some examples, the device identifier may indicate the type of device (e.g., the manufacturer and model). In other examples, the device identifier may be a unique network address (e.g., an IP address or Media Access Control address) to each computing device 14. In other examples, the device identifier may be a user defined name or label that differentiates each of computing devices 14 from each other. As described herein, the device identifier may be used to separate location identifiers into different location streams or groups of location indicators specific to each computing devices 14 (e.g., location indicators 26A, 26B, and 26C).

Network server 22 may include one or more desktop computers, mainframes, minicomputers, or other computing devices capable of executing computer instructions and storing data. In other examples, network server 22 may even include a mobile computing device with access to network 20 and/or repository 24. In this manner, network server 22 may include or be described as any computing device configured to perform the features described herein with respect to server 22. Network server 22 may include any hardware and software that enables network server 22 to receive location indicators 26 and determine which location indicators 26 are representative of the location of user 12. Repository 24 may include one or more memories, repositories, hard disks, or any other data storage device. In some examples, repository 24 may be included within network server 22. Network 20 may be a high-speed network (e.g., a WiFi, WiMax, wireless local area network, 3G, 4G, etc.) or another wireless network (e.g., a cellular or other data network). In some examples, network 20 may be embodied as one or more of the Internet, a wired network, or a fiber optic network. In other words, network 20 may be any data communication protocol or protocols that facilitate data transfer between two or more devices.

Repository 24 may be included in, or described as, cloud storage. In other words, location indicators 26 and/or instructions that embody the techniques described herein may be stored in one or more locations in the cloud (e.g., one or more repositories 24). Network server 22 may access the cloud and retrieve or transmit data as requested by an authorized user, such as computing devices 14. In some examples, repository 24 may include Relational Database Management System (RDBMS) software. In one example, repository 24 may be a relational database and accessed using a Structured Query Language (SQL) interface that is well known in the art. Repository 24 may alternatively be stored on a separate networked computing device and accessed by network server 22 through a network interface or system bus. Repository 24 may in other examples be an Object Database Management System (ODBMS), Online Analytical Processing (OLAP) database or other suitable data management system.

To facilitate the connection with networks and access-points to the media sharing service, computing device 14 may include a short-range communication module capable of communicating with various devices. Example short-range communication devices may include BLUETOOTH, WiFi, near field communication (NFC), or any other similar technology. The maximum distance between each of computing devices 14 and the other device (e.g., the vicinity or envelope surrounding each computing device 14), may be at least partially determined by the type of short-range communication used for the detection. In some instances, the maximum distance may be between approximately one meter and 100 meters. In one example, the maximum distance for the detection may be approximately 10 meters.

As described herein, server 22 and/or another computing device (e.g., a computing device 14) may filter location history from multiple devices associated with user 12 to determine which locations are representative actual user locations. The location history may include at least some of location indicators 26 received from multiple computing devices 14 over time. Although three computing devices 14 are shown in FIG. 1, two computing devices or four or more computing devices may be associated with user 12 in other examples. Since user 12 may only carry a selected one or two computing devices 14 at any given time, the location indicators 26 received by server 22 via network 20 may diverge as different computing devices 14 generate and/or transmit location indicators 26 representing different locations at approximately the same time. Therefore, location indicators 26 may be filtered and/or analyzed to determine which location indicators 26 were likely to be representative of the user's location. Server 22 and/or a computing device may use a location history module or one or more processors to perform the techniques described herein.

In one example, server 22 may receive a plurality of location indicators 26A from computing device 14A, a plurality of location indicators 26B from computing device 14B, and a plurality of location indicators 26C from computing devices 14C. Each of computing devices 14 may be associated with user 12, and location indicators 26 are representative of geographical locations at which each of the respective computing devices 14 has been located. Server 22 may also determine, based on the received location indicators 26, a subset of location indicators 26 associated with one of computing devices 14 that moved with user 12 during a period of time. For example, server 22 may be configured to determine the subset of location indicators 26 associated with the one of computing devices 14 that moved with user 12 during the period of time based on the distances between geographical locations represented by the location indicators of each of the respective computing devices 14. In other words, server 22 may use the distances between consecutively received or chronologically ordered location indicators for the period of time to determine the subset of location indicators associated with one of computing devices 14 that moved with user 12. Server 22 may repeat the determination process for two or more additional periods of time, such as hundreds or even thousands of additional periods of time. Server 22 may also output the subset of location indicators 26 that was determined for the each of the different periods of time.

A computing device may be associated with user 12 if the computing device is registered to user 12 by a service provider of the device, the user is logged in to one or more applications running on the computing device, or the user otherwise uses the computing device. For example, server 22 may detect for which user each of location indicators 26 should be associated. Server 22 may filter location history for multiple different users, so server 22 may need to be able to separate received location indicators 26 by user. In any event, each of computing devices 14 may be associated with a user based on some registration or login from the user that is stored in server 22 or repository 24.

In some examples, a processor or module of server 22 may output the subset of determined location indicators 26 to another processor or module of server 22. In this manner, server 22 may utilize the determined location indicators to provide a location based service to user 12 or another entity. For example, the determined location indicators representing or estimating user 12 locations may be used to provide location specific information to user 12 such as historical locations to which the user has traveled, destinations to which the user frequents, or travel routes the user has taken. In another example, server 22 may use the determined location indicators to predict or suggest places to which user 12 may like to visit, upcoming events, coupons related businesses, or even navigation directions based on previous locations. In addition, server 22 may use the selected location indicators to improve mapping services for user 12, or any other service or function that may benefit from information related to where user 12 has been located. In other words, server 22 and/or computing device 14 may use the selected location indicators to generate or determine information related to the selected subset of location indicators. Server 22 may be configured to output the related information to any mobile computing device associated with user 12.

Determining the location indicators from which computing device 14 that was carried or used by user 12 may include additional processes or steps. For example, server 22 may separate each of location indicators 26A, 26B, and 26C into respective individual location streams for each of the respective computing devices 14. In this manner, the location indicators received from each computing device 14 may be separated into the location stream specific to the computing device. Each location indicator 26 may include a device identifier or other tag or code that enables server 22 to identify from which computing device the location indicator was generated. In this manner, separating location identifiers 26 may include separating the location identifiers by respective device identifiers associated with each of the received location indicators. Each device identifier may represent one of computing devices 14.

Server 22 may also filter location noise from the received location indicators 26. In some examples, server 22 may filter the location noise from each of the individual location streams. Filtering the location noise may involve removing those of location indicators 26 that represent location changes due to at least one of cell tower reassignment, atmospheric conditions, and variable wireless network strength. As described herein, each of computing devices 14 may generate location indicators using different techniques, and some techniques may be more accurate than others. In addition, some location determining techniques may involve identifying the location of a cell tower to which the computing device is assigned or other network access point. At some times, the computing device may be reassigned or switched to another nearby cell tower or access point even though the computing device is stationary. This switching may be referred to as jitter and may erroneously represent computing device movement when in fact no movement has occurred.

Server 22 may be configured to remove these erroneous location indicators and filter this noise from the location information. For example, server 22 may search a sequence of consecutive location indicators $P_1$ through $P_n$, where $P_1$ and $P_n$ are within a small distance D of each other and have timestamps within a few minutes or hours of each other. Further, $P_1$ and $P_n$ may have a high reported accuracy. If $P_2$ through $P_{n-1}$ (e.g., indicators between $P_1$ and $P_n$) have a low reported accuracy and are farther than an error distance from $P_1$, then points $P_2$ through $P_{n-1}$ may be identified as erroneous indicators and removed from the location indicators retained or maintained in the location stream. In other examples, filtering of location noise may involve comparing the distance between consecutive location indicators and identifying when the distances are large, occur quickly, and/or oscillate. Other noise filtering techniques common in the art of signal noise filtering may similarly be used to remove inaccurate location indicators.

Determining the subset of location indicators representative of user movement may also include additional steps. For example, server 22 may, for each period of time, calculating the total distance between a subset of location indicators for each of the individual location streams during the respective period of time. The calculated total distances may be representative of the distance each of the respective computing devices 14 moved during the period of time. The total distance may be the sum of the distances between each consecutive location indicator in time for each location stream. In other words, the total distance may be the length or distance of the geographical path represented by the string of location indicators for the give period of time.

Server 22 may then compare the total distances for each of the location streams during the period of time. The location indicators of the location stream with the greatest total calculated distance as determined in the comparison step may be selected as the subset of location indicators that represent the location of user 12 for that period of time. Generally, computing devices moving may be assumed as being carried by user 12 or active whereas computing devices not moving may be assumed as being left behind by user 12 or inactive or idle. Therefore, computing devices generating location indicators representative of greater distance changes may be assumed to be carried by user 12.

However, in some examples, none of computing devices 14 may move at all or only move a minimal distance during a period of time. In this manner, the computing device or devices carried by user 12 may be inferred from adjacent periods of time. For example, server 22 may determine that the total distances for each of the location streams during the period of time are approximately equal. Server 22 may then identify which one of computing devices 14 was associated with the location indicators selected for the period time immediately preceding the period of time of question. In other words, server 22 may review which computing device was determined as carried by user 12 during the preceding period of time. Server 22 may then select the location indicators associated with the identified computing device for the period of time in which the distances were approximately equal. In other examples, server 22 may look to the subsequent period of time to determine which computing device was moving with the user and select location indicators from that computing device for the period of time in which the distances were equal. In other words, if a computing device was determined to be moving with the user in one period of time, server 22 may assume that the same computing device is with the user even if all computing devices have generated movements of approximately equal distances.

In other examples, server 22 may select location indicators for a period of time with computing devices moving equal distances based on the location indicators selected from a previous or subsequent period of time in which there was a location stream with a greater total distance traveled. Server 22 may match the location of selected location indicators in one period of time with the locations of unselected location indicators from the location streams in the adjacent period of time. Server 22 may select the location indicators in closest proximity to the previously, or subsequently, selected location indicators. In other words, server 22 may attempt to select location indicators in the proximity of one or more location indicators of adjacent periods of time. This proximity determination may thus maintain the likely continuity of user 12 travel.

Once server 22 determines the location indicators representative of user movement during each period of time, server 22 may store the subset of the location indicators selected for the respective periods of time. Server 22 may store the location indicators in a database maintained in repository 24. The database may include an entry for each period of time that includes the respective location indicators and/or an entry for each location indicator with a respective timestamp that identifies when the location indicator was generated and/or received by server 22. In some examples, server 22 may also identify the computing device or devices associated with the subset of the location indicators selected for each period of time. Server 22 may output the device identifier representing the identified computing device for the period of time. The device identifier may be attached to each location indicator or just the period of time. Server 22 may also store the device identifier with the respective location indicators in repository 24.

The device identifier for each period of time may also be used to determine to which of computing devices 14, for example, notifications or other information should be transmitted. For example, server 22 may have a notification regarding an upcoming calendar event or other information to send to user 12. Instead of transmitting the notification to all computing devices, server 22 may use the device identifier to select which one of the computing device to which the notification will be transmitted. Server 22 may then output the appropriate notifications to the selected one or more mobile computing devices.

In some examples, server 22 may discard and/or delete any location indicators that were not selected from each period of time. In this manner, server 22 may discard the subset of location indicators different than the subset selected as representing the location of user 12. The discarded subset of location indicators may thus be associated with the one or more computing devices 14 that did not move with user 12 during the respective periods of time. Discarding the unselected location indicators may prevent these indicators from contaminating the desired indicators. Discarded location indicators may be deleted from system 10. However, server 22 may, in some examples, store discarded location indicators in repository 24 for later analysis.

The period of time for each location indicators of each computing device 14 may, in some examples, be a preselected period of time. Server 22 may store instructions that indicate how long one or more periods of time may be. Longer periods of time may improve the accuracy of the determination of which of computing devices 14, and their respective location indicators 26, are representative of the user location for that period of time. However, the longer periods of time may not be capable of identify short duration switches between devices. Shorter periods of time may be more responsive to identifying when user 12 switches devices, but the fewer number of location indicators from each computing device may decrease the accuracy of the determination of which computing device was being used or carried by user 12 during the short period. A balance between selecting a short period for responsiveness and a long period for accuracy in the selection may be dependent upon the frequency of location indicator generation and transmittal and/or use patterns of each device.

Generally, each period of time may be selected to be between approximately one minute and one week. In a more specific example, each period of time may be between approximately 10 minutes and 24 hours. In another example, each period may be approximately 1 hour. Although each period of time may be of equal durations, server 22 may vary the periods of time in some examples. For example, server 22 may increase the period of time at time when user 12 is sleeping because user 12 is less likely to user a computing device or switch between devices. Conversely, server 22 may decrease the period of time for daytime hours during which user 12 may be more likely to switch between computing devices. In his manner, the duration of the periods of time may be dynamically changed due to various times of day, events, or user patterns.

Various aspects of the disclosure may be operable only when the user has explicitly enabled such functionality. For example, the user may be required to opt-in to or enable any functionality before location indicators may be transmitted. In addition, various aspects of the disclosure may be disabled by the user (e.g., the user may opt-out of any functionality at any time). Thus, a user may elect to prevent one or more of computing devices 14 from transmitting location indicators 26 or any other information related to the location of where the user visits or to where the user travels. In addition, the user may prevent computing devices 14 from transmitting information identifiable of the user without confirmation. Computing devices 14 may present one or more screens requesting that the user elect to transmit any or all information. In this manner, the user may control what information, if any, is transmitted to server 22. More generally, privacy controls may be applied to all aspects of the disclosure based on a user's privacy preferences to honor the user's privacy preferences for opting in or opting out of the functionality described in this disclosure.

Figure 2:
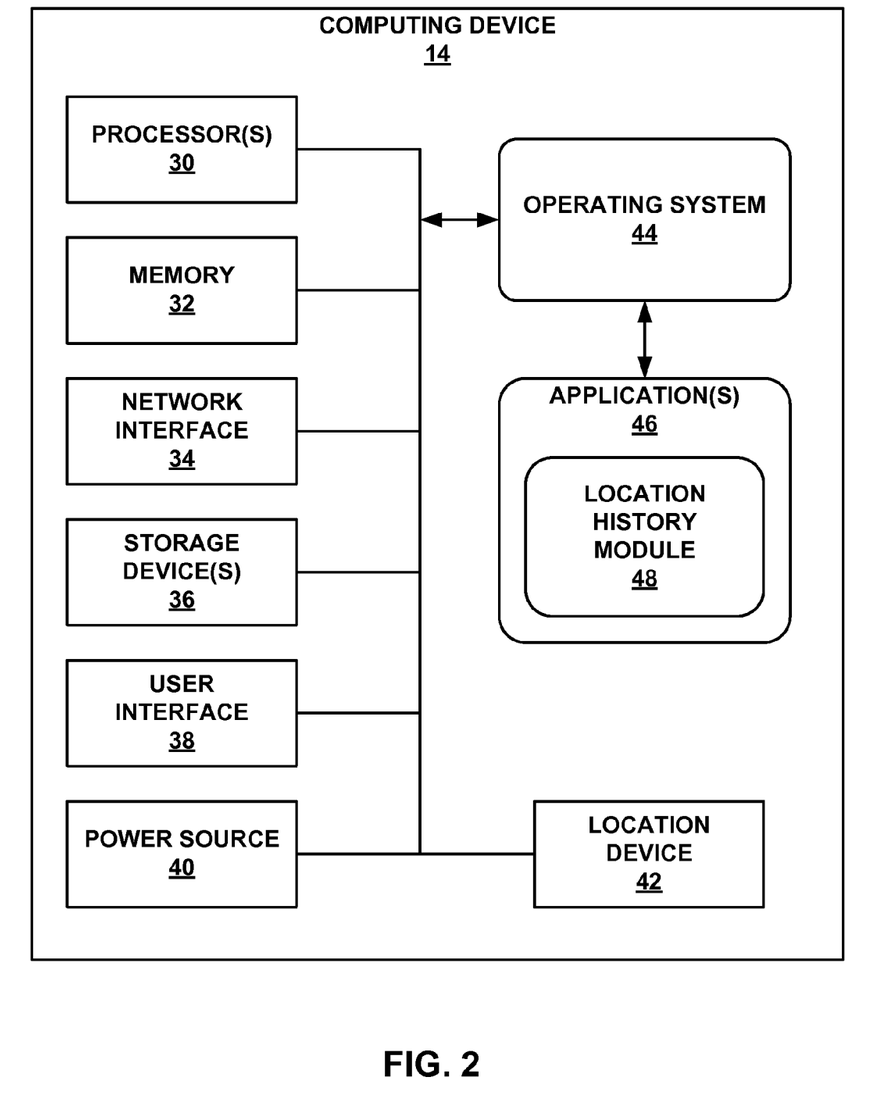
FIG. 2 is a block diagram illustrating components of one example of the computing device shown in FIG. 1.

FIG. 2 is a block diagram illustrating components of one example of computing device 14A shown in FIG. 1. FIG. 2 illustrates only one particular example of computing device 14A, and many other example embodiments of computing device 14A may be used in other instances. For example, computing device 14A may include additional components and run multiple different applications. In addition, computing devices 14B and 14C may include similar components to computing device 14A.

As shown in the specific example of FIG. 2, computing device 14A includes one or more processors 30, memory 32, a network interface 34, one or more storage devices 36, user interface 38, power source 40, and location device 42. Computing device 14A also includes an operating system 44, which may include modules and/or applications that are executable by processors 30 and computing device 14A, such as location history module 48. Computing device 14A, in one example, further includes one or more applications 46. One or more applications 46, such as location history module 48, are also executable by computing device 14A. Each of components 30, 32, 34, 36, 38, 40, 42, 44, 46, and 48 may be interconnected (physically, communicatively, and/or operatively) for inter-component communications.

Processors 30, in one example, are configured to implement functionality and/or process instructions for execution within computing device 14A. For example, processors 30 may be capable of processing instructions stored in memory 32 or instructions stored on storage devices 36. These instructions may define or otherwise control the operation of operating system 44 and application 46. Application 46, such as location history module 48 may control the generation and/or transmission of location indicators 26A and/or some or all of the processes for selecting which location indicators are representative of user movement. In other examples, multiple applications 46 may control the processes described herein such that each application controls one or more aspect of the entire process (e.g., one application may control generation of location indicators 26 and one application may control transmission of location indicators 26). Location history module 48 may perform some or all of the functions described herein and attributed to network server 22. Alternatively, network server 22 may perform all functions related to selecting location indicators without any need for location history module 48.

Memory 32, in one example, is configured to store information within computing device 14A during operation. Memory 32, in some examples, is described as a computer-readable storage medium. In some examples, memory 32 is a temporary memory, meaning that a primary purpose of memory 32 is not long-term storage. Memory 32, in some examples, is described as a volatile memory, meaning that memory 32 does not maintain stored contents when the computer is turned off. Examples of volatile memories include random access memories (RAM), dynamic random access memories (DRAM), static random access memories (SRAM), and other forms of volatile memories known in the art. In some examples, memory 32 is used to store program instructions for execution by processors 30. Memory 32, in one example, is used by software or applications running on computing device 14A (e.g., one or more of applications 46) to temporarily store information during program execution.

Storage devices 36, in some examples, also include one or more computer-readable storage media. Storage devices 36 may be configured to store larger amounts of information than memory 32 (e.g., location indicators 26). Storage devices 36 may further be configured for long-term storage of information. In some examples, storage devices 36 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 14A, in some examples, also includes a network interface 34. Computing device 14A, in one example, utilizes network interface 34 to communicate with external devices via one or more networks, such as network 20 in FIG. 1. Network interface 34 may be a network interface card, such as an Ethernet card, an optical transceiver, a radio frequency transceiver, or any other type of device that can send and receive information. Other examples of such network interfaces may include BLUETOOTH, 3G, 4G, and WiFi radios in mobile computing devices as well as USB. In some examples, computing device 14A utilizes network interface 34 to wirelessly communicate with external devices (e.g., network server 22) such as a server, mobile phone, or other networked computing device. As described herein, network interface 34 may be configured to transmit location indicators 26 and receive any data over network 20 as instructed by applications 46 and/or processors 30.

Computing device 14A, in one example, also includes one or more user interfaces 38. User interface 38 may be configured to receive input from a user (e.g., tactile, audio, or video feedback). User interface 38 may include a touch-sensitive and/or a presence-sensitive screen or display, mouse, a keyboard, a voice responsive system, or any other type of device for detecting a command from a user. User interface 38 may also include, combined or separate from input devices, output devices. In this manner, user interface 38 may be configured to provide output to a user using tactile, audio, or video stimuli. In one example, user interface 38 may include a touch-sensitive display, sound card, a video graphics adapter card, or any other type of device for converting a signal into an appropriate form understandable to humans or machines. In addition, user interface 38 may include a speaker, a liquid crystal display (LCD), light emitting diode (LED) array, or any other type of device that can generate intelligible output to a user.

Computing device 14A may also include one of more location device 42. Computing device 14A may use location device 42 to generate or otherwise obtain location indicators 26A. Location device 42 may include one or more satellite radios (e.g., a global positioning system (GPS) radio) capable of determining the geographical location of computing device 14A. Computing device 14A may utilize location device 42 to confirm the location of the computing device 14A, identify which networks may be available to computing device 14A, or determine the location of computing device 14A from such networks or network towers. Alternatively, location device 42 may utilize triangulation or other such techniques to determine the location of computing device 14A based on known geographical positions of network towers, network access points, or any other device that may communication with computing device 14A. In some examples, computing device 14A may also include one or more short-range communication devices (e.g., BLUETOOTH, WiFi, Ultra-Wideband radio or near-field communication devices).

Computing device 14A, in some examples, includes one or more power sources 40 such as a rechargeable battery that may provide power to computing device 14A. Power sources 40, in some examples, may be made from nickel-cadmium, lithium-ion, or other suitable materials. In other examples, power sources 40 may be capable of providing stored power or voltage from another stored energy (e.g., fuel cells or capacitors).

Computing device 14A may also include operating system 44. Operating system 44, in some examples, controls the operation of components of computing device 14A. For example, operating system 44, in one example, facilitates the interaction of application 46 with processors 30, memory 32, network interface 34, storage device 36, user interface 38, and location device 42.

Applications 46 may be a software and/or hardware module that controls generation and transmission of location indicators 26 and/or any other functions described herein. Applications 46, such as location history module 48, may provide commands to processors 30 to control any of the components of computing device 14A as needed during any aspect of the process. Although applications 46 may be software independent from operating system 44, applications 46 may be a sub-routine of operating system 44 in other examples. Applications 46 may also include sub-modules that execute various aspects of the posting and transmission process. In some examples, the user may be required to initiate applications 46 by selecting the application from a list of applications stored on computing device 14A. Alternatively, applications 46 may automatically launch location history module 48 upon powering up computing device 14 or upon receiving a request from user 12 to generate and transmit location indicators 26.

Computing device 14A may include additional components or sensors to perform functionality described herein. For example, computing device 14A may include one or more accelerometers to detect accelerations of computing device 14A that may indicate computing device 14A is moving. Any applications or modules (e.g., applications 46) implemented within or executed by computing device 14A may be implemented or contained within, operable by, executed by, and/or be operatively/communicatively coupled to components of computing device 14A (e.g., processors 30, memory 32, network interface 34, and/or storage devices 36).

Figure 3:
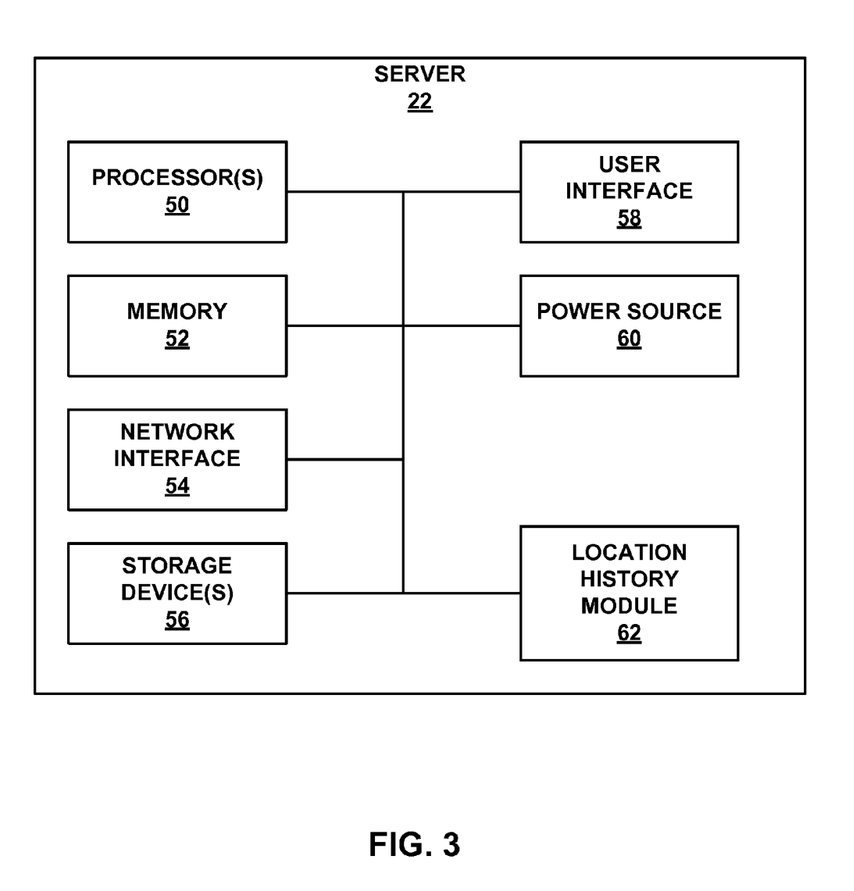
FIG. 3 is a block diagram illustrating components of one example of the server shown in FIG. 1.

FIG. 3 is a block diagram illustrating components of one example of network server 22. FIG. 3 illustrates only one particular example of network server 22 (e.g., a computing device), and many other example embodiments of network server 22 may be used in other instances. For example, network server 22 may include additional components, run multiple different applications, and/or include multiple different servers. In some examples, network server 22 may include multiple servers in communication over network 20 and/or another network. As shown in the specific example of FIG. 3, network server 22 includes one or more processors 50, memory 52, a network interface 54, one or more storage devices 56, user interface 58, power source 60, and location history module 62. Server 22 may also include an operating system that includes modules (e.g., location history module 62) and/or applications that are executable by processors 50. Each of components 50, 52, 54, 56, 58, 60, and 62 may be interconnected (physically, communicatively, and/or operatively) for inter-component communications. Server 22 may also be in communication with repository 24 or even include repository 24 as one of storage devices 56.

Processors 50, in one example, are configured to implement functionality and/or process instructions for execution within server 22. For example, processors 50 may be capable of processing instructions stored in memory 52, instructions stored on storage devices 56, or instructions stored in repository 24. Location history module 62 may be a hardware and/or software module configured to perform the various functions described herein related to selecting or determining which location indicators from multiple devices are representative of the location of a user associated with the computing devices. Location history module 62 may, for example, calculate total distances for location indicators of respective location streams and periods of time, determining the greatest total distance of the location indictors of each location stream and the respective periods of time, and filter location noise from the location indicators. In other examples, processors 50 may at perform some or all of the functions of location history module 62. Alternatively, server 22 may offload some or all of the functions of location history module 62 to computing device 14, other network servers, or other computing devices.

Memory 52, in one example, is configured to store information within server 22 during operation. Memory 52, in some examples, is described as a computer-readable storage medium. In some examples, memory 52 is a temporary memory, meaning that a primary purpose of memory 52 is not long-term storage. Memory 52, in some examples, is described as a volatile memory, meaning that memory 52 does not maintain stored contents when the computer is turned off. Examples of volatile memories include random access memories (RAM), dynamic random access memories (DRAM), static random access memories (SRAM), and other forms of volatile memories known in the art. In some examples, memory 52 is used to store program instructions for execution by processors 50.

Storage devices 56, in some examples, also include one or more computer-readable storage media. Storage devices 56 may be configured to store larger amounts of information than memory 52 (e.g., cluster information 28 and/or location indicators 26). Storage devices 56 may further be configured for long-term storage of information. In some examples, storage devices 56 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories. Repository 24 may also include one or more computer-readable storage media, in some examples.

Server 22, in some examples, also includes a network interface 54 configured to communicate with other devices and transmit and/or receive data via network 20, for example. Network interface 54 may be a network interface card, such as an Ethernet card, an optical transceiver, a radio frequency transceiver, or any other type of device that can send and receive information (e.g., location indicators 26). In alternative examples, network interface 54 may include BLUETOOTH, 3G, 4G, and WiFi radios in mobile computing devices as well as USB.

User interface 38 may be configured to receive input from a user (e.g., tactile, audio, or video feedback) when direct interaction with server 22 is desired. User interface 38 may include a touch-sensitive and/or a presence-sensitive screen or display, mouse, a keyboard, a voice responsive system, or any other type of device for detecting a command from a user. User interface 38 may also include, combined or separate from input devices, output devices. User interface 38 may include a speaker, a liquid crystal display (LCD), light emitting diode (LED) array, or any other type of device that can generate intelligible output to a user. Power source may include a battery and/or circuit for generating power from an AC or DC power source.

In other examples, server 22 may include additional components to perform functionality described herein. Any applications or modules (e.g., location history module 62) implemented within or executed by network server 22 may be implemented or contained within, operable by, executed by, and/or be operatively/communicatively coupled to components of network server 22 (e.g., processors 50, memory 52, network interface 54, and/or storage devices 56).

Figure 4:
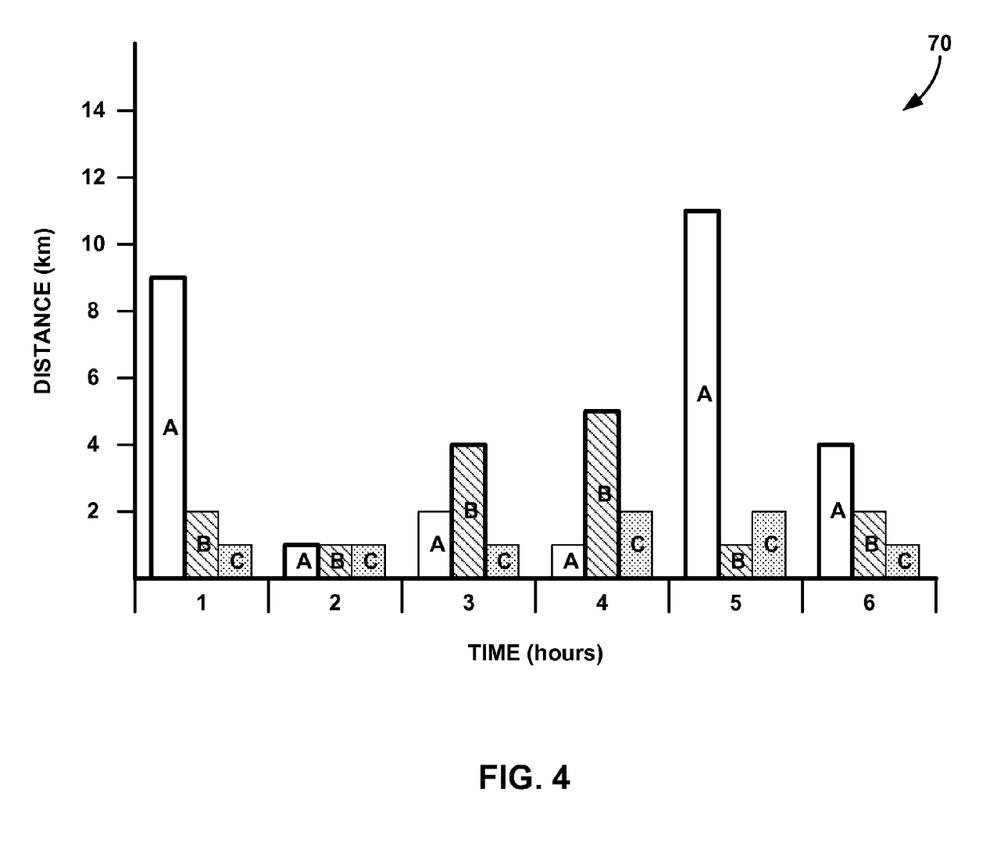
FIG. 4 is a graph of example distances calculated between location indicators of respective computing devices and each periods of time.

FIG. 4 is an example graph 70 of example total distances calculated between location indicators 26 of respective computing devices 14 and for each period of time. As shown in FIG. 4, each different period of time is provided on the x-axis. Although each period of time is approximately one hour in the example of FIG. 4, the periods of time may be of different durations in other examples. The distance in kilometers (km) is provided on the y-axis.

As described herein, location indicators 26 may have been separated into individual location streams for each of computing devices 14. Server 22 may have separated location indicators 26 using respective device identifiers associated with each of the location indicators to identify the device origin for each location indicator. Server 22 may have also calculated the total distance between the location indicators 26 for each location stream and within each period of time. This calculated total distance is shown in graph 70.

For each period of time (e.g., each one-hour block or bucket of time) shown in the x-axis, the total or cumulative distance that each computing device 14 has traveled (based on the distance between each consecutive location indicator within the period of time) is shows as a separate vertical bar. The location indicators from computing devices 14A, 14B, and 14C are presented as bars A, B, and C, respectively. For example, in time period 1, the total distance of the location indicators from computing device 14A is approximately 9 km. Also for time period 1, the total distances of the location indicators from computing devices 14B and 14C are approximately 2 km and 1 km, respectively. After comparing the distances of bars A, B, and C of time period 1, the total distance of bar A is determined to be greater than any of the other computing devices. The location indicators from computing device 14A may thus be selected for time period 1. The location indicators from computing devices 14B and 14C for time period 1 may be discarded.

The same comparison of the total distances of each of bars A, B, and C may continue for each of the periods of time. For example, the location indicators from computing device 14B may be selected for time periods 3 and 4. In addition, the location indicators from computing device 14A may again be selected for time periods 2, 5, and 6. The location indicators received from computing device 14C may not be selected for any of the shown time periods because the total distance for these location indicators were never greater than the distances for other computing devices for the same period of time.

In time period 2, all of the total distances for computing devices 14A, 14B, and 14C may be approximately equal. Therefore, server 22 may look to the previous time period to determine which location indicators to select from time period 2. Since the location indicators from computing device 14A had the greatest total distance and were selected in time period 1, and all of the distances in time period 2 are approximately equal, server 22 may again select the location indicators from computing device 14A. This selection may assume that computing device 14A may have stayed with user 12 during time period 2 because user 12 was not moving during time period 2. In other examples, server 22 may look to subsequent time periods to select the location indicators of time period 2. Alternatively, server 22 may analyze the actual locations of the location indications from each of computing devices 14 to look for which locations were proximate or maintained location continuity with the locations of selected location indications in time period 1 and/or 2.

Even though some of computing devices 14 did not move during some of the periods of time, the location indicators may still suggest that the respective computing device moved a small distance. For example, none of computing devices 14 may have moved during time period 2, yet the total distance for each computing device may be approximately 1 km. This unexpected distance may be due to device switching between different cell towers, access points, or certain location generating devices used over time. For example, a stationary computing device that switches or is reassigned to a different cell tower may appear to be moving because the locations of subsequent location indicators are different. Even when location indicators are filtered for location noise, some noise may still remain. In other examples, any total distance below a threshold within a single period of time may be zeroed and assumed that the device did not actually move. The threshold may be dependent upon the time period. For example, the threshold may be selected between approximately 500 meters and 5 km. In one example, the threshold may be approximately 1 km for a period of time of one hour.

Graph 70 may be provided for illustrative purposes in the example of FIG. 4. However, graph 70 may be outputted and transmitted by server 22 to another module or device in other examples. Server 22 may generate similar graphs or tables of data based on any of the calculations or comparisons described herein.

Figure 5:
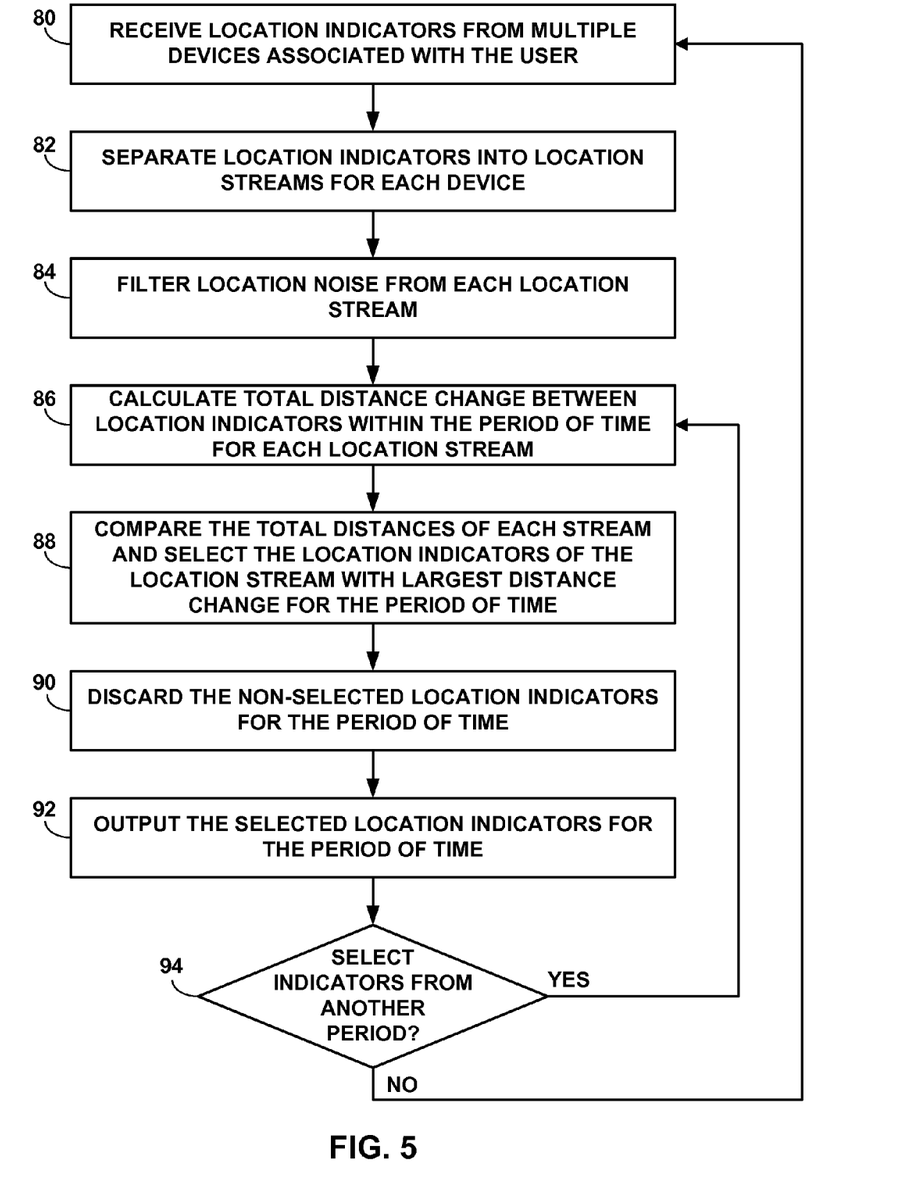
FIG. 5 is a flow diagram illustrating an example process that may be performed by a server to determine which location indicators from multiple computing devices represent movement of a user during a period of time.

FIG. 5 is a flow diagram illustrating an example process that may be performed by server 22 to determine which of location indicators 26 from multiple computing devices 14 represent movement of user 12 during different periods of time. For purposes of illustration only, location history module 62 of network server 22 will be described as performing the process of FIG. 5. However, in some examples, location history module 62 may include one or more processors and location history module 62 may be controlled by one or more software applications and associated modules. In other examples, one or more steps of the process may be performed by other devices, such as location history module 48 of one or more of computing devices 14.

As shown in FIG. 5, the process may begin with location history module 62 receiving location indicators 26 from multiple computing devices 14 each associated with user 12 (80). Location history module 62 may then separate location indicators 26 into individual location streams for each of computing devices 14 (82). Once the location indicators are separated into their respective location streams, location history module 62 may filter location noise from each of the location streams (84). Filtering of location noise may include removing those location indicators that are identified as erroneous or otherwise inconsistent with other location indicators.

Location history module 62 may then calculate the total distance change between location indicators within the period of time and for each of the location streams (86). For example, location history module 62 may calculate and sum the distances between each consecutive location identifiers of the location stream and within the period of time. Location history module 62 may then compare the total distances from each location stream and select the location indicators of the location stream with the largest distance change for the period of time (88). Location history module 62 may discard any of the non-selected location indicators for that period of time (90). Location history module 62 may then output the selected location indicators as a subset of location indicators for the period of time (92). The selected subset of location indicators may be representative of the geographical locations at which user 12 was located during that period of time.

If location history module 62 determines that there are additional location indicators to be selected for another period of time ("YES" branch of block 94), location history module 62 may, for the another period of time, calculate the total distances for the location indicators of the new period of time (86). If location history module 62 determines that there are no more periods of time for which location indicators are to be selected ("NO" branch of block 94), location history module 62 may again receive location indicators from computing devices 14 (80).

In other examples, fewer or more steps may be provided in the example of FIG. 5. For examples, location history module 62 may not filter location noise. In some examples, the non-selected location indicators may not be discarded. In other examples, additional steps may be included such as selecting the duration of one or more periods of time and/or selecting location indicators from location streams with equal total distances for the period of time based on selections from proximate periods of time.

In one example, a method includes receiving, at a computing device, a first plurality of location indicators from a first mobile computing device and a second plurality of location indicators from a second mobile computing device, wherein the first and second computing devices are both associated with a single user and the first and second pluralities of location indicators are representative of geographical locations at which each of the respective first and second mobile computing devices has been located, determining, by the computing device, a subset of the location indicators associated with one of the first or second mobile computing devices that moved with the user during a period of time, wherein the determined subset of the location indicators are based on the received first and second plurality of location indicators, and outputting, by the computing device, the subset of the location indicators for the period of time.

In another example, a computing device includes one or more processors and a location history module operable by the one or more processors to receive a first plurality of location indicators from a first mobile computing device and a second plurality of location indicators from a second mobile computing device, wherein the first and second mobile computing devices are associated with a user and the first and second pluralities of location indicators are representative of geographical locations at which each of the respective mobile computing devices has been located, determine, based on the received first and second plurality of location indicators, a first subset of the location indicators associated with one of the first or second mobile computing devices that moved with the user during a first period of time, determine, based on the received first and second plurality of location indicators, a second subset of the location indicators associated with one of the first or second mobile computing devices that moved with the user during a second period of time different than the first period of time, and output the first and second subsets of the location indicators for the respective first and second periods of time.

In another example, a computer-readable storage medium is encoded with instructions that cause one or more processors of a mobile computing device to receive a first plurality of location indicators from a first mobile computing device and a second plurality of location indicators from a second mobile computing device, wherein the first and second mobile computing devices are associated with a user and the first and second pluralities of location indicators are representative of geographical locations at which each of the respective mobile computing devices has been located, determine, based on the received first and second plurality of location indicators, a first subset of the location indicators associated with one of the first or second mobile computing devices that moved with the user during a period of time, discard a second subset of the location indicators different than the first subset of the location indicators, wherein the second subset of location indicators is associated with one of the first or second mobile computing devices that did not move with the user during the period of time, and output the first subset of the location indicators for the period of time.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. In some examples, the functions of units, modules, or components may also be distributed between components of multiple devices or systems. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Example computer-readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or any other computer readable storage devices or tangible computer readable media.

In some examples, a computer-readable storage medium may comprise non-transitory medium. The term "non-transitory" may indicate that the storage medium is not embodied in a carrier wave or a propagated signal. In certain examples, a non-transitory storage medium may store data that can, over time, change (e.g., in RAM or cache).

Various aspects of the disclosure have been described. These and other embodiments are within the scope of the following claims.

What is claimed is:

1. A method comprising:
   receiving, at a server computing device, a first plurality of location indicators from a first mobile computing device and a second plurality of location indicators from a second mobile computing device, wherein the first and second computing devices are both associated with a single user and the first and second pluralities of location indicators are representative of geographical locations at which each of the respective first and second mobile computing devices has been located;
   automatically determining, by the server computing device, a selected subset of one of the first plurality of location indicators or the second plurality of location indicators for a period of time, all location indicators included in the selected subset being associated with the one of the first mobile computing device or the second mobile computing device that moved with the user during the period of time, wherein location indicators associated with the one of the first mobile computing device or the second mobile computing device that did not move with the user during the period of time being unselected; and
   outputting, by the server computing device, information related to the selected subset of the location indicators for the period of time.

2. The method of claim 1, wherein the period of time is a first period of time and the selected subset of location indicators is a first selected subset of location indicators, and wherein the method further comprises:
   determining a second selected subset of one of the first plurality of location indicators or the second plurality of location indicators for a second period of time different than the first period of time, each location indicator included in the second selected subset being associated with the one of the first mobile computing device or the second mobile computing device that moved with the user during the second period of time; and
   outputting the second selected subset of the location indicators for the second period of time.

3. The method of claim 1, further comprising separating the first plurality of location indicators and the second plurality of location indicators into respective individual location streams for each of the first mobile computing device and the second mobile computing device.

4. The method of claim 3, wherein:
   separating the first plurality of location indicators and the second plurality of location indicators comprises separating the location indicators by respective device identifiers associated with each of the received location indicators of the first plurality and second plurality of location indicators, and
   each device identifier represents the one of the first mobile computing device or second mobile computing device.

5. The method of claim 3, further comprising removing, from the respective individual location streams for each of the first mobile computing device and the second mobile computing device, location indicators representing location changes due to at least one of cell tower reassignment, atmospheric conditions, and variable wireless network strength.

6. The method of claim 3, wherein:
   determining the selected subset of one of the first plurality of location indicators or the second plurality of location indicators comprises, for the period of time, calculating a first total distance between a subset of location indicators of the individual location stream for the first mobile computing device and a second total distance between a subset of location indicators of the individual location stream for the second mobile computing device, and
   the calculated first and second total distances are representative of a respective distance each of the first and second mobile computing devices moved during the period of time.

7. The method of claim 6, wherein determining the selected subset of the location indicators comprises:
   comparing the first total distance and the second total distance for each of the respective location streams during the period of time; and
   selecting, for the period of time and based on the comparison, one of the subset of the location indicators of the individual location stream for the first mobile computing device or the subset of location indicators of the individual location stream for the second mobile computing device associated with the greatest total distance.

8. The method of claim 6, wherein the period of time is a first period of time, the selected subset of location indicators is a first selected subset of location indicators, and determining the first selected subset of the location indicators further comprises:
   comparing the first and second total distances for each of the respective location streams during the first period of time;
   determining that the first and second total distances for each of the respective location streams during the first period of time are approximately equal;
   identifying the one of the first or second mobile computing devices associated with a second selected subset of location indicators selected for a second period time immediately preceding the first period of time; and
   selecting, as the first selected subset of the location indicators, the location indicators received for the first period of time and associated with the identified mobile computing device.

9. The method of claim 1, further comprising storing the selected subset of the location indicators for the period of time.

10. The method of claim 1, further comprising:
    identifying the one of the first or second mobile computing device associated with the selected subset of the location indicators; and
    outputting, for the period of time, a device identifier representing the identified mobile computing device.

11. The method of claim 1, further comprising discarding an unselected subset of the location indicators, the unselected subset being different than the selected subset, wherein the unselected subset of the location indicators is associated with the one of the first or second mobile computing devices that did not move with the user during the period of time.

12. The method of claim 1, wherein the period of time is a preselected period of time between approximately 10 minutes and 24 hours.

13. The method of claim 1, further comprising outputting, for presentation at a display of at least one of the first mobile computing device, the second mobile computing device, or a third mobile computing device, information related to the selected subset of the location indicators.

14. A computing device comprising:
    one or more processors; and
    a location history module operable by the one or more processors to:
       receive a first plurality of location indicators from a first mobile computing device and a second plurality of location indicators from a second mobile computing device, wherein the first and second mobile computing devices are both associated with a user and the first and second pluralities of location indicators are representative of geographical locations at which each of the respective mobile computing devices has been located;
       automatically determine a first selected subset of one of the first plurality of location indicators or the second plurality of location indicators for a first period of time, all location indicators included in the first selected subset being associated with the one of the first mobile computing device or the second mobile computing device that moved with the user during the first period of time, wherein location indicators associated with the one of the first mobile computing device or the second mobile computing device that did not move with the user during the first period of time being unselected;
       automatically determine a second selected subset of one of the first plurality of location indicators or the second plurality of location indicators for a second period of time different than the first period of time, all location indicators included in the second subset being associated with the one of the first mobile computing device or the second mobile computing device that moved with the user during the second period of time, wherein location indicators associated with the one of the first mobile computing device or the second mobile computing device that did not move with the user during the second period of time being unselected; and
       output information related to the first and second selected subsets of the location indicators for the respective first and second periods of time.

15. The computing device of claim 14, wherein the location history module is operable by the one or more processors to:
    separate the first plurality of location indicators and the second plurality of location indicators by respective device identifiers associated with each of the received first plurality and second plurality of location indicators, wherein each device identifier represents the one of the first mobile computing device or the second mobile computing device;
    for each of the first and second periods of time, calculate a first total distance between location indicators of the individual location stream for the first mobile computing device and a second total distance between location indicators of the individual location stream for the second mobile computing device during the respective period of time, wherein the calculated first and second total distances are representative of the distance each of the first mobile computing device and the second mobile computing device moved during the respective periods of time;
    for each of the first and second periods of time, compare the first and second total distances for each of the respective location streams during the respective period of time; and
    for each of the first and second periods of time, select, based on the comparison and as the respective subset of location indicators, the location indicators associated with the greatest total distance.

16. The computing device of claim 15, wherein the location history module is operable by the one or more processors to remove, from the respective individual location stream for each of the first mobile computing device and the second mobile computing device, location indicators representing location changes due to at least one of cell tower reassignment, atmospheric conditions, and variable wireless network strength.

17. The computing device of claim 14, wherein the computing device comprises a network server, and wherein the network server comprises the location history module.

18. A non-transitory computer-readable storage medium encoded with instructions that cause one or more processors of a computing device to:
- receive a first plurality of location indicators from a first mobile computing device and a second plurality of location indicators from a second mobile computing device, wherein the first and second mobile computing devices are associated with a user and the first and second pluralities of location indicators are representative of geographical locations at which each of the respective mobile computing devices has been located;
- automatically determine a first selected subset of one of the first plurality of location indicators or the second plurality of location indicators for a period of time, all location indicators included in the selected subset being associated with the one of the first mobile computing device or the second mobile computing device that moved with the user during the period of time;
- discard a second unselected subset of one of the first plurality of location indicators or the second plurality of location indicators different than the first subset of the location indicators, wherein the second subset of location indicators is associated with the one of the first mobile computing device or second mobile computing device that did not move with the user during the period of time; and
- output information related to the first selected subset of the location indicators for the period of time.

19. The non-transitory computer-readable storage medium of claim 18, further comprising instructions that cause the one or more processors to:
- separate the first plurality of location indicators and the second plurality of location indicators into respective individual location streams by respective device identifiers associated with each of the received first and second plurality of location indicators, wherein the device identifiers each represent the one of the first mobile computing device or the second mobile computing device;
- for the period of time, calculate a first total distance between location indicators of the individual location stream for the first mobile computing device and a second total distance between location indicators of the individual location stream for the second mobile computing device during the period of time, wherein the calculated first and second total distances are representative of the distance each of the respective first and second computing devices moved during the period of time;
- compare the first and second total distances for each of the location streams during the period of time; and
- select, as the first selected subset and based on the comparison, the location indicators associated with the greatest total distance.

20. The non-transitory computer-readable storage medium of claim 18, further comprising instructions that cause the one or more processors to, prior to calculating the first total distance between location indicators of the individual location stream for the first mobile computing device and a second total distance between location indicators of the individual location stream for the second mobile computing device, remove location indicators representing location changes due to at least one of cell tower reassignment, atmospheric conditions, and variable wireless network strength.

* * * * *